(12) United States Patent
Yu et al.

(10) Patent No.: US 7,098,606 B2
(45) Date of Patent: *Aug. 29, 2006

(54) ELECTRONIC BALLAST WITH OPEN CIRCUIT VOLTAGE CONTROL AND CABLE COMPENSATION

(75) Inventors: Qinghong Yu, Salem, MA (US); Christopher Radzinski, Huntsville, AL (US); Peter Shackle, Rolling Hills Estates, CA (US); John Jay Dernovsek, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/004,625

(22) Filed: Dec. 3, 2004

(65) Prior Publication Data

US 2005/0168165 A1   Aug. 4, 2005

Related U.S. Application Data

(60) Provisional application No. 60/526,638, filed on Dec. 3, 2003.

(51) Int. Cl.
*H05B 37/02* (2006.01)

(52) U.S. Cl. ............... 315/291; 315/224; 315/307; 315/DIG. 7

(58) Field of Classification Search ............... 315/291, 315/224, 225, 307, 209 R, 105, 106, DIG. 2, 315/DIG. 5, DIG. 7
See application file for complete search history.

(56) References Cited

U.S. PATENT DOCUMENTS

| | | | |
|---|---|---|---|
| 5,083,065 A * | 1/1992 | Sakata et al. .......... 315/DIG. 7 |
| 5,436,529 A | 7/1995 | Bobel .................... 315/106 |
| 5,444,336 A * | 8/1995 | Ozawa et al. .......... 315/DIG. 5 |
| 5,493,180 A | 2/1996 | Bezdon et al. ........... 315/106 |
| 5,500,576 A | 3/1996 | Russell et al. ........... 315/307 |
| 5,636,111 A | 6/1997 | Griffin et al. ............ 315/225 |
| 5,770,925 A | 6/1998 | Konopka et al. ......... 315/225 |
| 5,945,788 A | 8/1999 | Li et al. .................. 315/291 |
| 5,969,483 A | 10/1999 | Li et al. .................. 315/224 |
| 5,982,106 A | 11/1999 | Bobel .................. 315/209 R |
| 6,121,731 A * | 9/2000 | Kanazawa et al. .... 315/209 R |
| 6,127,786 A | 10/2000 | Moison .................. 315/291 |
| 6,169,369 B1 | 1/2001 | Nerone et al. ............ 315/106 |
| 6,211,623 B1 | 4/2001 | Wilhelm et al. .......... 315/224 |

(Continued)

FOREIGN PATENT DOCUMENTS

EP      0061730      7/1982

(Continued)

*Primary Examiner*—Wilson Lee
*Assistant Examiner*—Ephrem Alemu
(74) *Attorney, Agent, or Firm*—Waddey & Patterson; Jason L. Hornkohl

(57) ABSTRACT

An electronic ballast uses a voltage sampling circuit and a voltage control circuit to limit the open circuit voltage of the ballast. A lamp voltage sensing circuit is provided that uses a voltage dividing capacitor to accomplish lossless monitoring of the open circuit voltage of the ballast. A resistor placed in series with the sampling capacitor is used to create a voltage that turns a control transistor off and on. The control transistor produces a gating signal trimming signal that a half bridge driver uses to alter the gating signals provided to the inverter transistors of the ballast. A cable compensation circuit is included that minimizes variations in the open circuit voltage due to the connecting and disconnecting of a cable to the ballast by turning the control transistor off and on.

20 Claims, 2 Drawing Sheets

U.S. PATENT DOCUMENTS

| | | | |
|---|---|---|---|
| 6,259,215 B1 * | 7/2001 | Roman | 315/307 |
| 6,316,887 B1 | 11/2001 | Ribarich et al. | 315/307 |
| 6,424,101 B1 * | 7/2002 | Sabate | 315/291 |
| 6,501,225 B1 | 12/2002 | Konopka | 315/105 |
| 6,552,494 B1 | 4/2003 | Randazzo et al. | 315/106 |
| 6,936,973 B1 * | 8/2005 | Parra et al. | 315/224 |
| 2002/0105283 A1 | 8/2002 | Murakami et al. | 315/224 |
| 2003/0025464 A1 | 2/2003 | Konopka | 315/291 |

FOREIGN PATENT DOCUMENTS

| | | |
|---|---|---|
| EP | 0576991 | 5/1994 |

* cited by examiner

ELECTRONIC BALLAST WITH OPEN CIRCUIT VOLTAGE CONTROL AND CABLE COMPENSATION

CROSS-REFERENCES TO RELATED APPLICATIONS

This application is a Non-Provisional Utility application which claims benefit of now abandoned U.S. patent application Ser. No. 60/526,638 filed Dec. 3, 2003, entitled "High Input Voltage Microcontroller Based Instant Start Ballast" which is hereby incorporated by reference.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

One problem with prior art electronic ballasts is that the open circuit voltage of an instant start ballast needs to be controlled when there is not a lamp coupled to the ballast. Unfortunately, prior art methods of providing this open circuit voltage control cause substantial variations in the open circuit voltage when used in conjunction with different lengths of cable, or require a high value resonant capacitor which results in a high circulating current. A high circulating current is undesirable in that it increases the conduction losses in the ballast and may result in capacitive mode switching occurring during the striking transients. Therefore, an improved method and apparatus for controlling the open circuit voltage of a high input voltage electronic ballast is needed.

In some prior art ballasts, the voltage on a lamp voltage sensing resistor is used to control the open circuit voltage during striking when no lamp is connected. To accomplish this, the pulse width of one switch of the half bridge is typically controlled. Controlling the pulse width controls the open circuit voltage indirectly by using inductor current to control the voltage on the capacitor. As a result, large open circuit voltage variations often result when external connections to the fixture, such as a connecting cable, add extra capacitance. In ballast implementations that can afford to use a large resonant capacitor and a small inductor, the open circuit voltage variation problem is generally not significant. However, potentially damaging hard switching or capacitive mode switching is often observed with this type of prior art open circuit voltage controlled ballast. Furthermore, the use of a large resonant capacitor makes the resonant tank difficult to design. As a result, these types of ballasts suffer from more conduction losses and/or hard switching during the striking of the lamp than do typical ballasts. Conduction losses and hard switching are undesirable in that they may cause the ballast to fail. A large resonant capacitor, with a striking voltage of two lamps across it, stores a substantial amount of energy. When the striking attempt occurs when there is no load, the striking energy is transferred to the resonant inductor and can saturate the inductor. The result is undesirable hard switching occurring during the striking. Even though a MOSFET can survive the high stress transients in ballasts with a 460V bulk voltage, hard switching is undesirable and should be avoided if possible. Furthermore, for some types of ballasts, it is critically important to avoid hard switching due to their particular susceptibility to damage from transients. Thus, in many of the prior art ballasts, the resonant capacitor value is minimized and a cable compensation circuit is utilized to control the open circuit voltage such that it is substantially constant when coupled to various lengths of cable having various amounts of capacitance. However, these circuits are often overly complex and, thus, decrease the efficiency of the ballast while increasing its cost. Therefore, an improved method and apparatus for controlling the open circuit voltage of a ballast and compensating for the effects any attached cables is needed.

BRIEF SUMMARY OF THE INVENTION

A preferred embodiment of the present invention is directed toward an electronic ballast for igniting and powering a gas discharge lamp connected between a pair of output terminals. The ballast includes a microcontroller for controlling the ballast and an inverter having a first transistor and a second transistor. A snubber circuit reduces turn-off losses in the first transistor and the second transistor. The snubber circuit comprises a pair of series connected snubber capacitors connected in parallel with the first transistor and the second transistor. A resonant tank having a tank inductor connected in series with a tank capacitor is included. A sampling capacitor is connected in series with the tank capacitor. A voltage sampling circuit monitors the output voltage by monitoring a voltage on the sampling capacitor. A voltage control resistor is connected in series with the sampling capacitor. An output voltage control circuit senses a voltage across the voltage control resistor and provides the sensed voltage to the microcontroller. The output voltage control circuit includes a transistor and the gate of the transistor is electrically connected between the sampling capacitor and the voltage control resistor by means of a resistor. The logic circuit controls an output voltage on the output terminals based upon the sensed voltage. The logic circuit controls the output voltage by trimming this gating signal for at least one of the first and the second transistors. A cable compensation circuit limits variations in the output voltage due to cables being connected to the output terminals of the ballast. The cable compensation circuit includes means for sampling a voltage across the sampling capacitor and controlling a gating signal for at least one of the first and second transistors based thereon.

Another embodiment of the invention is directed toward an electronic ballast for providing power to a gas discharge lamp. The ballast includes a microcontroller for controlling the electronic ballast. An inverter circuit having a first transistor and a second transistor and a resonant tank circuit having a tank inductor connected in series with a tank capacitor are also included. A voltage sampling circuit samples an output voltage of the electronic ballast and communicates the sampled voltage to the microcontroller. The voltage sampling circuit includes a sampling capacitor connected in series with the tank capacitor. The voltage sampling circuit also preferably includes a resistive and capacitive circuit for filtering the sampled voltage prior to providing the sampled voltage to the microcontroller. An output voltage control circuit limits the output voltage by producing a gate trimming signal that is used by gating logic to control one of the first and second transistors. The output voltage control circuit includes a resistor connected in series with the sampling capacitor wherein a voltage across the resistor is used to turn a control transistor off and on. A cable compensation circuit limits variations in the output voltage caused by connecting a cable to the output terminals. The cable compensation circuit limits the output voltage by decreasing a gating signal pulse width for at least one of the first and second transistors.

Yet another embodiment of the present invention is directed toward an electronic ballast for producing an output voltage on a pair of output terminals for powering a gas discharge lamp. The ballast includes a microcontroller for controlling the electronic ballast. A half-bridge inverter circuit having a pair of transistors and a resonant tank circuit having a tank capacitor are included in the ballast. An output voltage sampling circuit monitors the output voltage by monitoring a voltage across a sampling capacitor connected in series with the tank capacitor. The output voltage sampling circuit includes a resistive and capacitive circuit for filtering the sampled voltage prior to providing the sampled voltage to the microcontroller. An output voltage control circuit having a control resistor connected in series with the sampling capacitor limits the output voltage based upon a voltage on the control resistor. The output voltage control circuit further includes a control transistor wherein a voltage existing across the control resistor is used to turn the control transistor off and on. A resistive voltage divider is connected to the gate of the control transistor. The control transistor causes the logic circuit to trim a gating signal for at least one of the first transistor and the second transistor based upon the monitoring of the control transistor. Cable compensation circuitry compensates for variations in the output voltage due to a capacitive cable being connected to the output terminals. The cable compensation circuitry includes means for altering a gating signal of at least one of the first transistor and the second transistor.

DETAILED DESCRIPTION OF THE INVENTION

Figure 1:
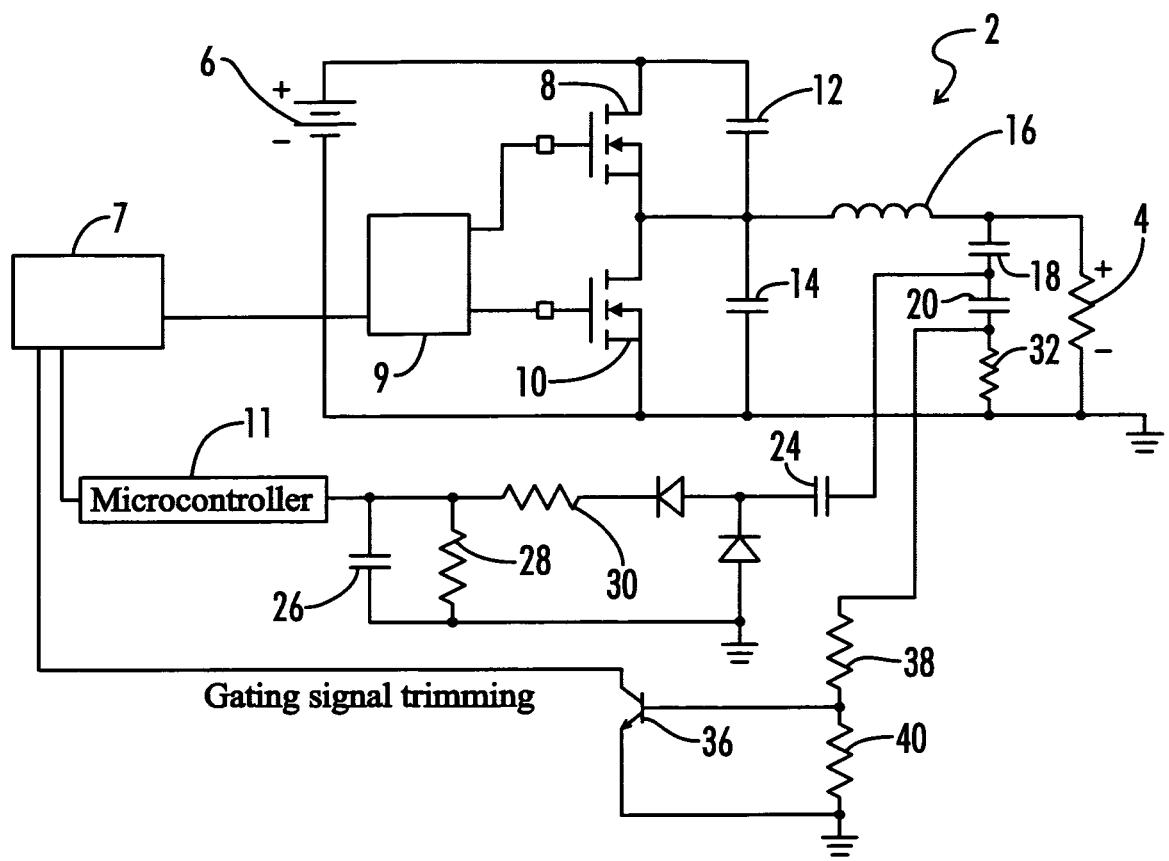
FIG. 1 is a schematic diagram of an electronic ballast having a lossless voltage sampling circuit and an open circuit voltage control circuit in accordance with a preferred embodiment of the present invention.

A preferred embodiment of the present invention is directed toward an instant start electronic ballast for a gas discharge lamp that overcomes the aforementioned deficiencies of the prior art. Referring now to FIG. 1, an electronic ballast 2 that provides substantially lossless open circuit voltage control in accordance with a preferred embodiment of the present invention is shown. The electronic ballast 2 includes a bulk DC voltage source 6 that provides power to the inverter circuit transistors 8 and 10, each of which is preferably connected in parallel with a respective snubber capacitor 12 and 14. The series resonant tank of the electronic ballast is comprised of a resonant tank inductor 16 and a resonant tank capacitor 18. Prior art circuits use a resistor connected in series with the resonant capacitor 18 to sense the lamp voltage 4 and control the open circuit voltage 4 when no lamp is installed. However, in a preferred embodiment of the present invention for an IHRV ballast and/or sign ballast, the lamp voltage 4 is sensed by a sampling capacitor 20 that is connected in series with the resonant capacitor 18 as shown in FIG. 1. Using the principle of voltage division with capacitors, when the sampling capacitor 20 is much smaller than the resonant capacitor 18, the voltage drop on the sampling capacitor 20 is very large compared to the voltage on the resonant capacitor 18 and vice versa. This is beneficial in that it is relatively easy to find a film capacitor 20 that satisfies these criteria, has a small package size and is inexpensive. Moreover, the creation of large voltage drop across capacitor 20 provides a wide voltage range for the voltage sampling such that the full range of the A/D converter of a microcontroller 11 can be utilized. Most preferably, the capacitor 20 is a 330 nF 60V or a 680 nF 60V capacitor. A sampling circuit comprised of capacitors 24 and 26 and resistors 28 and 30 is used to filter and condition the sampled voltage signal from capacitor 20 for processing by the microcontroller 11. The sampling circuit of FIG. 1 provides a low output impedance, strong signal with an excellent signal to noise ratio and a quick response time to the A/D converter input of the associated microcontroller 11. More importantly, since the sampling is accomplished across the capacitor 20, the sampling process is substantially lossless and does not significant decrease the efficiency of the ballast 2. Thus, the circuit of FIG. 1 uses lossless capacitor based voltage division to improve the efficiency of the ballast 2 without sacrificing performance.

The sampling capacitor 20 used in the ballast of FIG. 1 is connected in series with a low value resistor 32, which is used to control the open circuit voltage 4. The electronic ballast 2 samples a large amplitude version of the lamp voltage 4 across capacitor 20. The sampled signal is smoothed by RC filters constructed from capacitors 24 and 26 and resistors 28 and 30 and then fed to the A/D converter of the microcontroller 11. The response time of the sampled lamp voltage 4 is not fast, but it very advantageous in that it is lossless. For open circuit voltage 4 control, the amplitude of the voltage across resistor 32 is large enough when the ballast 2 strikes to turn on transistor 36 and thereby produce a signal that can be used by gating logic 7 to trim the pulse width of the gating signal produced by the half bridge driver 9 for the upper switch 8 of the half bridge inverter. Trimming the gating signal of the upper switch 8 of the half bridge inverter decreases the open circuit voltage 4 produced by the ballast 2. The exact value at which such gate signal trimming will occur is determined by the value of the resistors 38 and 40 which control the turning off and on of transistor 36. Most preferably, resistors 38 and 40 both have a value of 1 kΩ. Trimming the pulse width of the gating signal of the upper switch 8 limits the open circuit voltage 4. During steady state operation, the voltage on the resistor 32 is very small, out of phase with the voltage on capacitor 20, and still proportional to the lamp voltage 4. Hence, the lamp voltage sensing is not affected by the resistor 32 when the ballast 2 is operating in the steady state.

The sampling circuit described above with respect to FIG. 1 can be used independently with or without a cable compensation circuit. Since the voltage on resistor 32 is in phase with the current of the upper switch 8, it is convenient to use the voltage on resistor 32 to control the open circuit voltage 4 when no lamp is connected and to trim the pulse width of the upper switch 8 of the half-bridge as discussed above. However, when a long cable is connected to the output voltage terminals 4 of the ballast 2 and the capacitance of the cable is essentially in parallel with the resonant capacitor 18, the parameters of the resonant tank constructed from inductor 16 and capacitor 18 changes. As a result, the open circuit voltage 4 decreases when a cable is connected to the ballast 2. When the value of the resonant capacitor 18 is small, the decrease in the open circuit voltage 4 is significant and the ballast 2 will not strike the lamp. The open circuit voltage 4 can be set high to start a lamp with a long cable. However, in applications where no cable is attached, the open circuit voltage 4 will then be too high, which may cause the ballast to fail the through-lamp leakage test, or damage the film capacitor 20. Increasing the capacitance of the resonant capacitor 18 helps to decrease the variation of the open circuit voltage 4 but increases the conduction losses due to the circulation currents in the resonant capacitor 18. Furthermore, larger capacitor values lead to saturation of the resonant inductor 16. Therefore, the most preferred embodiments of the present invention include a cable compensation circuit.

Figure 2:
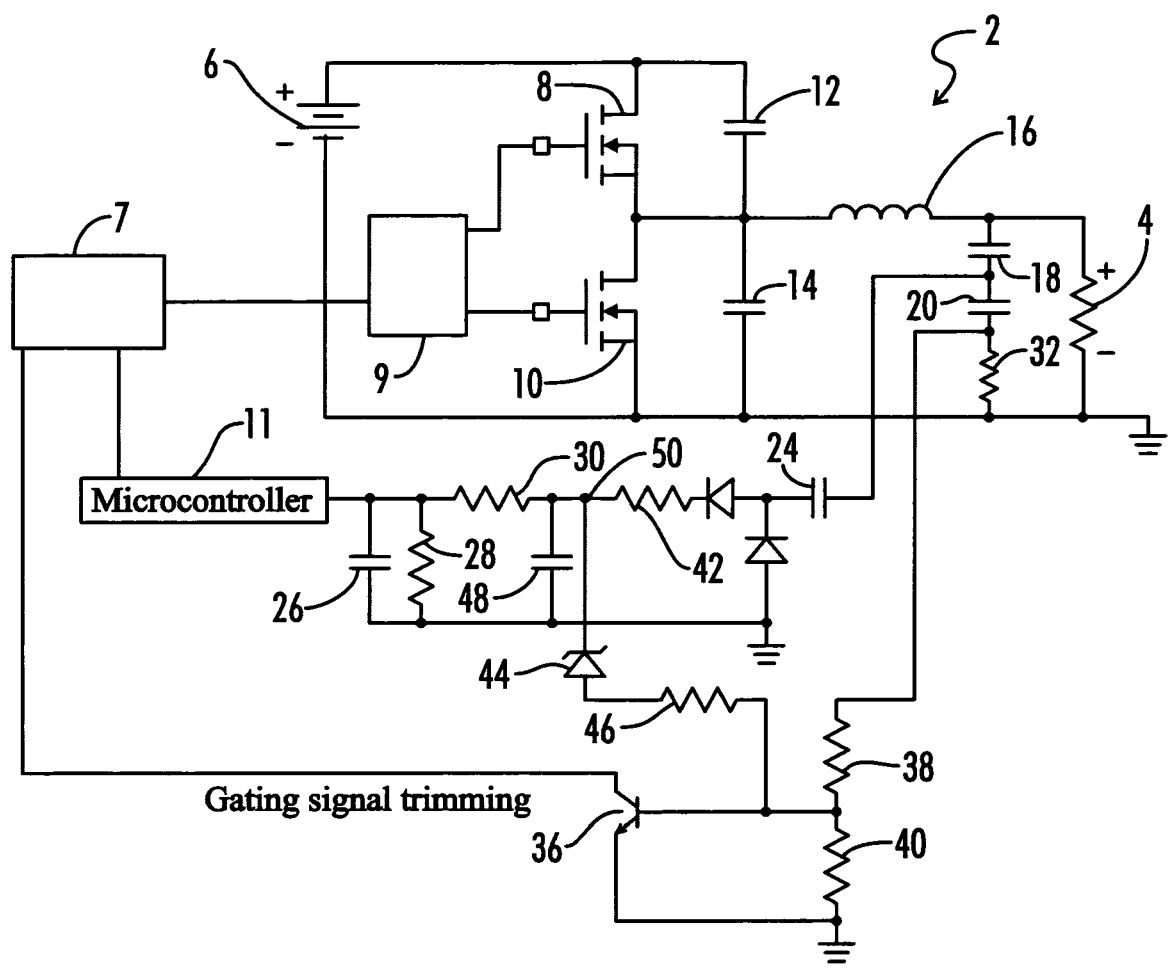
FIG. 2 is a schematic diagram of the electronic ballast of FIG. 1 having a cable compensation circuit in accordance with a preferred embodiment of the present invention.

A cable compensation circuit is created by adding zener diode 44, resistors 42 and 46, and capacitor 48 as set forth in FIG. 2. The open circuit voltage 4 as sampled by capacitor 20 rises very rapidly at node 50. When the open circuit voltage 4 becomes too high, the zener diode 44 starts to conduct and feeds current to the base of transistor 36 such that the conductive threshold for the transistor 36 is decreased. Thus, the transistor 36 starts to turn-on earlier when the voltage on resistor 32 is lower. The pulse width of the gating signal of the upper switch 8 then is trimmed such that the pulse becomes narrower, thereby reducing the open circuit voltage 4. So, the true open circuit voltage 4 is sensed in this way to change the current threshold required to turn-off the upper switch 8 of the half bridge inverter. In an exemplary circuit constructed as described above, the open circuit voltage 4 varies from 1.9 kv to 2.6 kv without the cable compensation circuit of FIG. 2 when 18 feet of cable is connected to or removed from the circuit. However, with the cable compensation circuit of FIG. 2, the variation in the open circuit voltage 4 is within approximately 100V. Thus, an electronic ballast having a lossless voltage sampling and control circuit and a cable compensation circuit in accordance with the preferred embodiment of the present invention as shown in FIG. 2 represents a substantial improvement upon the prior art.

Thus, although there have been described particular embodiments of the present invention of a new and useful "Electronic Ballast with Open Circuit Voltage Control and Cable Compensation", it is not intended that such references be construed as limitations upon the scope of this invention except as set forth in the following claims.

What is claimed is:

1. An electronic ballast for igniting and powering a gas discharge lamp connected between a pair of output terminals, comprising:
    a microcontroller for controlling the ballast;
    an inverter having a first transistor and a second transistor;
    a resonant tank having a tank inductor connected in series with a tank capacitor;
    a sampling capacitor connected in series with said tank capacitor;
    a voltage control resistor connected in series with said sampling capacitor; and
    an output voltage control circuit for sensing a voltage across said voltage control resistor and providing said sensed voltage to gating logic wherein said logic controls an output voltage on said output terminals based upon said sensed voltage.

2. The electronic ballast of claim 1 wherein said output voltage control circuit further comprises a transistor wherein a gate of said transistor is electrically connected between said sampling capacitor and said voltage control resistor by means of a resistor.

3. The electronic ballast of claim 1 further comprising a snubber circuit for reducing turn-off losses in said first transistor and said second transistor wherein said snubber circuit comprises a pair of series connected snubber capacitors connected in parallel with said first transistor and said second transistor.

4. The electronic ballast of claim 1 wherein said logic controls said output voltage by trimming a gating signal for at least one of said first and said second transistors.

5. The electronic ballast of claim 1 further comprising a cable compensation circuit that limits variations in the output voltage due to cables being connected to the output terminals of the ballast.

6. The electronic ballast of claim 5 wherein said cable compensation circuit comprises means for sampling a voltage across said sampling capacitor and controlling a gating signal for at least one of said first and second transistors based thereon.

7. The electronic ballast of claim 1 further comprising a voltage sampling circuit that monitors said output voltage by monitoring a voltage on said sampling capacitor.

8. An electronic ballast for providing power to a gas discharge lamp comprising:
    a microcontroller for controlling said electronic ballast;
    an inverter circuit having a first transistor and a second transistor;
    a resonant tank circuit having a tank inductor connected in series with a tank capacitor;
    a voltage sampling circuit for sampling an output voltage of said electronic ballast and communicating said sampled voltage to said microcontroller; and
    an output voltage control circuit for limiting said output voltage by producing a gate trimming signal that is used by gating logic to control one of said first and said second transistors.

9. The electronic ballast of claim 8 wherein said voltage sampling circuit includes a sampling capacitor connected in series with said tank capacitor.

10. The electronic ballast of claim 8 wherein said voltage sampling circuit includes a resistive and capacitive circuit for filtering said sampled voltage prior to providing said sampled voltage to said microcontroller.

11. The electronic ballast of claim 8 wherein said output voltage control circuit includes a resistor connected in series with said sampling capacitor wherein a voltage across said resistor is used to turn a control transistor off and on.

12. The electronic ballast of claim 9 further comprising a cable compensation circuit for limiting variations in said output voltage caused by connecting a cable to said output terminals.

13. The electronic ballast of claim 12 wherein said cable compensation circuit limits said output voltage by decreasing a gating signal pulse width for at least one of said first and said second transistors.

14. An electronic ballast for producing an output voltage on a pair of output terminals for powering a gas discharge lamp, said ballast comprising:
    a microcontroller for controlling said electronic ballast;
    a half-bridge inverter circuit including a pair of transistors;

a resonant tank circuit having a tank capacitor;

an output voltage sampling circuit for monitoring said output voltage by monitoring a voltage across a sampling capacitor connected in series with said tank capacitor; and an output voltage control circuit including a control resistor connected in series with said sampling capacitor wherein said output voltage control circuit limits said output voltage based upon a voltage on said control resistor.

15. The electronic ballast of claim 14 further comprising cable compensation circuitry for compensating for variations in said output voltage due to a capacitive cable being connected to said output terminals.

16. The electronic ballast of claim 15 wherein said cable compensation circuitry includes means for altering a gating signal of at least one of said first transistor and said second transistor.

17. The electronic ballast of claim 14 wherein said output voltage control circuit further comprises a control transistor wherein a voltage existing across said control resistor is used to turn said control transistor off and on.

18. The electronic ballast of claim 17 wherein said control transistor is used to trim a gating signal for at least one of said first transistor and said second transistor.

19. The electronic ballast of claim 18 further comprising a resistive voltage divider connected to a gate of said control transistor.

20. The electronic ballast of claim 14 wherein said output voltage sampling circuit includes a resistive and capacitive circuit for filtering said sampled voltage prior to providing said sampled voltage to said microcontroller.

* * * * *